United States Patent [19]

Jain

[11] Patent Number: 5,284,364
[45] Date of Patent: Feb. 8, 1994

[54] INCREASED-SECURITY IDENTIFICATION CARD SYSTEM

[75] Inventor: Kanti Jain, Briarcliff Manor, N.Y.

[73] Assignee: Anvik Corporation, Elmsford, N.Y.

[21] Appl. No.: 897,199

[22] Filed: Jun. 10, 1992

[51] Int. Cl.$^5$ .............................................. B42D 15/00
[52] U.S. Cl. ........................................ 283/87; 283/89; 283/90; 283/91; 359/489; 359/501
[58] Field of Search ...................... 283/87, 90, 91, 904; 359/2, 489, 490, 501; 340/825.34

[56] References Cited

U.S. PATENT DOCUMENTS

| | | | |
|---|---|---|---|
| 3,313,052 | 4/1967 | Malster | 359/489 X |
| 3,313,941 | 4/1967 | Marks | 359/489 X |
| 3,391,479 | 7/1968 | Buzzell et al. | 359/489 X |
| 3,610,120 | 10/1971 | Morse et al. | 283/91 X |
| 3,683,764 | 8/1972 | Johnson | 359/489 X |
| 3,827,726 | 8/1974 | McVoy et al. | 283/87 X |
| 4,175,775 | 11/1979 | Kruegle | 283/91 X |
| 4,659,112 | 4/1987 | Reiner et al. | 283/90 |
| 5,004,327 | 4/1991 | Rosen | 283/89 X |
| 5,033,829 | 7/1991 | Faroughy | 359/501 X |
| 5,059,776 | 10/1991 | Antes | 359/2 X |

*Primary Examiner*—Paul A. Bell
*Attorney, Agent, or Firm*—Carl C. Kling

[57] ABSTRACT

The invention is a document security system characterized by a data substrate having photographic or printed information on a base print, and also having a personalized polarization-altering overlay sealed to the base print and encoded with additional coded information readable under the influence of a polarizing viewer. The low-security information, such as name, social security, account number and photograph, are printed on a card to form the base print. Additional information of greater security, which may be a bar code or alphanumeric characters, is imprinted in the polarization-altering overlay by an appropriate physical process, such as radiation exposure or thermal, chemical or mechanical treatment, which optically modifies localized regions of the overlay. Tampering with the card, which will require removing and physically modifying the overlay, altering the base print information, and resealing the overlay, will create optical errors which become evident when the tampered document is viewed through the polarizing viewer. The invention provides an security document system with tamper-resistant and tamper-evident features that are easy to detect and difficult to imitate, the document also being long-lasting and cost-effective to produce and use. The invention is applicable to identification documents such as drivers' licenses, passports and immigration cards, and also to monetary instruments such as credit cards, stock and bond certificates, and currency notes.

20 Claims, 4 Drawing Sheets

Fig. 5a 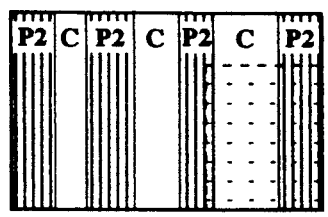  Fig. 5b
Fig. 5c 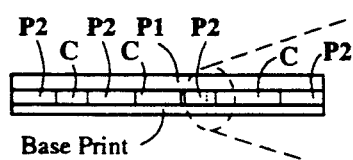 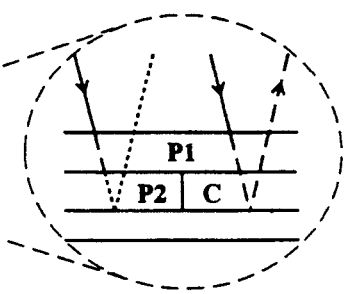 Fig. 5d
Fig. 6a 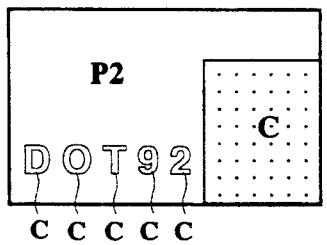 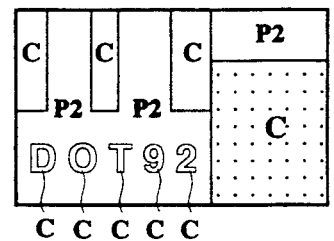 Fig. 6b

INCREASED-SECURITY IDENTIFICATION CARD SYSTEM

BACKGROUND OF THE INVENTION

1. Field of the Invention

This invention relates to an increased-security security document system, and more particularly relates to an identification card having a polarization-altering overlay over at least one field; such field when viewed through a properly polarized viewer provides both tamper evidence and a view of otherwise non-visible security data.

2. Description of Related Art

Several methods to provide security features to prevent counterfeiting of a variety of valuable documents are known, including monetary printed documents (such as paper currency, stock certificates and bonds), identification documents (such as drivers' licenses and passports) and multi-purpose documents (such as credit cards, debit cards and key cards). The importance of security in such documents is emphasized not only by the financial aspects of forged financial instruments, but also by the fact that traffic accidents caused by underage drivers and frequent traffic violators with suspended licenses who procure alcohol using false drivers' licenses and other identification documents are major contributors to fatalities, injuries and property damage.

Methods of making security documents tamper-resistant go back to prehistory, including baked ceramic tablets with cuneiform writing and seals, which made altering of information difficult without also breaking the seal. In recent years, several more advanced techniques for fabricating security documents have been practised. Whereas certain features of these prior-art methods are noteworthy, by and large they have not been successful in reducing counterfeiting due to the ease with which it is possible to either simply duplicate original documents or decipher the precise elements of a particular method that give it its uniqueness. In many cases, the prior-art methods have not been sufficiently economical to implement. Below I briefly describe the known methods, and then summarize their limitations.

Complex Printing

The baked cuneiform tablet, the embossed coin, the wax seal, the paper currency note, and the engraved stock certificate—these are all examples of security items embodying complex printing. Some of these may contain such varied features as multiple colors, serial numbers, engraved seals, and signatures. Although the printing equipment required to produce original documents by this method is expensive, making reasonable facsimiles using high-resolution color duplicating machines is not difficult.

Complementary Pattern Overlays

U.S. Pat. No. 3,827,726, McVoy et al, IDENTIFICATION CARDS, provides self-validation by complementary partial pattern overlays, with careful registration by aligning registration marks, to complete a visible validation pattern, repetitions of the tiny printed word "VALID."

Filament Embedding

Filament embedding in security documents has long been practised in various forms. Documents printed on special paper with significant rag content, with threads of selected color or pattern make counterfeiting difficult. Recent improvements have led to the embedding of metallic filaments which can be easily detected by metal detectors of various types. A more recent development employs embedded fibers with microscopic printing on the fiber itself.

Water Marks

This technique involves creating a distinguishing pattern or a set of alphanumeric characters, called a water mark, in the paper on which the document is printed. Examples of such documents range from currency bills to high-quality bond paper. The water mark is produced by embossing, thermal treatment, or a combination of the two processes. As a security feature for identification cards, this technique is not only easy to duplicate with minor equipment expense, it is also limited to paperlike media which lack durability in long-term use.

Holographic Images

Here, the distinguishing feature of the document is a holographic image of a pattern, object, or set of alphanumeric characters. The image is produced by optical interference between two light beams, one called the reference beam, and the other originating from the object to be recorded. The interference pattern thus generated is recorded in a suitable recording medium. A hologram can be viewed as a complex diffraction grating, in which the various diffracting elements are so oriented that when illuminated with a playback light beam, they recreate the original object. The process of producing such holograms, usually called white-light holograms, has been made so simple and economical that they are now found even in the most inexpensive products such as costume jewelry, various trinkets and throw-away promotional items. As a result, identification cards with holographic images are not difficult to duplicate. Also, holographic images affixed on thin and flexible media are not long-lasting.

Magnetic Stripes

In this method, a magnetic stripe is deposited on the card surface and recorded electronically with identification data using methods and apparatus similar in principle to those used for recording data on computer disks. All credit cards employ security features of this type. Several other applications, such as some mass-transit fare tickets, also use magnetic stripes. Although magnetically encoded documents are difficult to tamper with, the method is not well suited for identification cards. Such cards, if on a hard plastic base with a photograph, will be expensive to produce, and if on a soft base, will have a short use life. Most importantly, any tampering of the magnetic data will not readily be evident to an examiner, such as a liquor store salesperson or a police officer. For this technique to be effective, each detecting agent or agency must possess a magnetic card reader, which will add significantly to the cost of implementation on a large scale.

Encapsulation

It is common practice to encapsulate a magnetically encoded security document in a sealed and laminated plastic pouch to protect the data from wear and tampering, and to make any tampering evident if the encapsulation is broken. One such tamper-evidencing technique is selective tear-away of portions of the data-bearing surface to expose a tampering indicator, such as the word "VOID", which is directly viewable.

A more sophisticated tamper-evidencing system is shown in U.S. Pat. No. 4,659,112, Reiner et al., IDENTIFICATION SYSTEM COMPRISING A PARTIALLY REFLECTIVE RETARDATION DEVICE, Apr. 21, 1987. This prior art shows a tamper-evident identification card system utilizing a laminated sandwich of a 90-degree retarder layer, a specular reflective layer and an information-bearing layer. The information-bearing layer is the substrate, on top of which is sputtered a partially reflecting layer of a metal or metal oxide, which is then overlaid with by the retarder layer. To get access to the information-bearing layer for altering the information, the retarder and the partially reflecting layers must be damaged. Any attempt to overprint the data on top of the retarder layer will obscure the retarder. Either type of tampering will render regions of the retarder dysfunctional, and will produce patterns of a visible color change when the card is viewed through a linear polarizer analyzer. Reiner et al. show an additional feature analogous to a watermark. A patterned mark is introduced into the retarder layer destroying its retarding effect in the pattern of the mark by, for example, pressing a heated stamp in the pattern.

U.S. Pat. No. 3,391,479, Buzzel et al, LAMINATIONS, provides tamper-evidencing by a mixture of positive and negative dichroic dyes with isotropic dyes to create a laminated stripe overlayer which evidences tampering, by color change, when the stripe is viewed through a polarizer.

Personalization, Password and Countersign

Most security documents are personalized in some form. The personalization may include the document holder's name, other identifying information, photograph and signature. More elaborate personalization, such as that found in many credit cards with magnetic stripes, may come in various forms of password-and-countersign activity with a validating person or computer. Here, the document holder is required to provide a password or a personal identification number as a countersign to information contained in the card for validation. In visual media, such personalization is not known in prior art. In magnetic media, the coding and reading of password-and-countersign information requires special equipment.

Limitations of Prior-Art Document Counterfeit Prevention Techniques

Below I summarize the shortcomings of the above prior-art methods for application in production of tamper-proof identification cards.

Complex and finely printed patterns are subject to copying in high-resolution color copying machines.

Documents containing embedded metal filaments are easy to tamper with and duplicate. A metal filament does not provide uniqueness to the secured document, making it possible to set up large-scale counterfeit operations.

Water marks are suitably produced only in paper-like media, which do not provide the necessary longevity. They are also easy to duplicate in counterfeiting shops.

White-light holographic images are readily duplicated with rudimentary equipment set-up. Large-scale production of holographic images makes it difficult to produce them with sufficient distinguishing differences. Holographic images affixed on thin and fexible paper or plastic media such as those used for drivers' licenses are not long-lasting.

Identification cards containing data-encoded magnetic stripes and the holder's photograph on a hard base will be expensive to produce. If produced on soft media, such cards will have very short life spans. Tampering of magnetic stripes is not readily evident visually, and detection will require use of special equipment. Other encapsulation techniques do not facilitate provision of personalizable information.

Thus, the existing techniques for providing counterfeit-resistant security features in identification cards and other documents suffer from major limitations. Ideally, whereas the cards should have tamper-proof features that are easy to detect and difficult to imitate, they should also be cost-effective to produce and be long-lasting.

SUMMARY OF THE INVENTION

The invention is a high-security document security system characterized by a data substrate having photographic or printed information on a base print, and also having a personalized polarization-altering overlay encoded with additional security information such that when viewed through a polarizing viewer, the system provides both evidence of tampering and a view of otherwise non-visible security data.

The object of the invention is to provide an identification card with tamper-resistant and tamper-evident features that are easy to detect and difficult to imitate, the card also being long-lasting and cost-effective to produce and use.

Another object of the invention is to provide an elegant identification card encapsulated under a personalized polarization-altering film which when properly viewed with a polarizing viewer provides evidence of tampering and also makes visible certain otherwise hidden security information.

A feature of the invention is that a great deal of information may be put on the card in various levels of security, including totally viewable, semi-secure, and secure.

Another feature of the invention is that the identification card may contain both non-personalizable and personalizable security information.

Another feature of the invention is that the security information may be stored in machine-readable form with various levels of security against tampering and against unauthorized reading.

An advantage of the invention is that the security document requires sophisticated equipment to produce the security information, thus giving it protection against manufacturing or altering by unskilled or unequipped counterfeiters; simultaneously, it retains its capability of being examined for validity or tampering reliably, rapidly, and without requiring special equipment or skill.

Another advantage of the invention is its elegant simplicity.

Another advantage of the invention is its adaptability to a great number of different applications, since its elegant simplicity and its low cost make it economical to produce individually personalized security documents in various sizes and in small numbers.

Other objects, features and advantages of the invention will be apparent from the following specification and from the annexed drawings and claims.

BRIEF DESCRIPTION OF THE DRAWINGS

FIG. 5 is a diagram in four sketches a, b, c and d, showing a counterfeit-prevention and tamper-detection technique in which polarizing regions P2 and clear regions C alternate in stripes forming a bar code.

FIG. 6 is a diagram illustrating counterfeit-prevention and tamper-detection configurations in two sketches a and b. Sketch 6a shows polarization-coded alphanumeric characters and a photograph, and sketch 6b shows a polarization-coded bar code as well as alphanumeric characters and a photograph.

SCIENTIFIC BACKGROUND

Polarization of Light (FIG. 1)

Figures 1A, 1B, 1C:
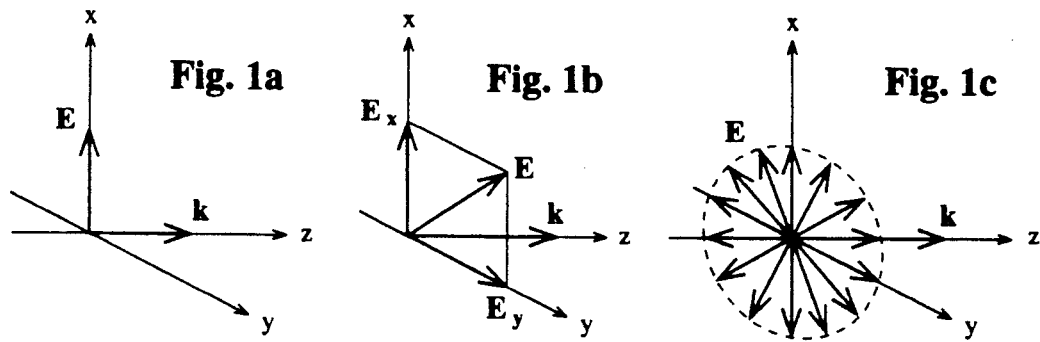
FIG. 1 is a diagram in three sketches a, b and c, showing the nature of polarized and unpolarized light.

Optical radiation is represented by a superposition of electromagnetic plane waves consisting of electric and magnetic field vectors which are perpendicular to the direction of propagation of the light. For any light ray, its direction of polarization refers to the orientation of its electric field vector, E. In linearly polarized light, the E-vector is in a certain fixed direction, with the magnetic field vector, H, being such that E, H and the direction of propagation (represented by a vector k) are all mutually orthogonal to each other. Both the E- and H-vectors oscillate sinusoidally at the frequency of the light. The light emitted by most lasers is linearly polarized. FIG. 1(a) illustrates linearly polarized light with its direction of polarization along the x-axis. Linearly polarized light with its polarization axis along any general direction can be represented, as shown in FIG. 1(b), by a vector sum of two fields, $E_x$ and $E_y$, which oscillate in phase. If $E_x$ and $E_y$ have equal amplitudes but oscillate 90° out of phase, we get circularly polarized light. Elliptic polarization results when the phase difference between $E_x$ and $E_y$ is 90°, but their amplitudes are unequal. In unpolarized light, the total E-field is a random superposition of E-vectors along all possible directions perpendicular to k, as illustrated in FIG. 1(c). The randomness refers to the fact that the amplitudes and phases of the different E-vectors are completely uncorrelated with each other. Examples of unpolarized light include radiation from incandescent and fluorescent lamps. Any unpolarized light beam can be represented as a sum of two linearly polarized beams with mutually orthogonal polarization axes. It is possible to convert unpolarized light into polarized light. It is also possible to alter the phase relationship between the E-field components of polarized light. The principles of such polarization transformations and means for producing them are described below.

Figure 2:
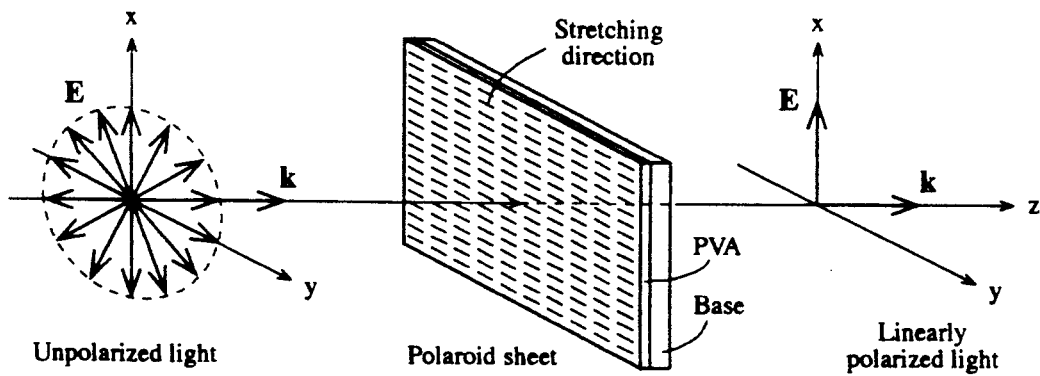
FIG. 2 is a sketch showing conversion of unpolarized light into polarized light by a polaroid sheet as a result of absorption of electric-field components parallel to the stretching direction of the polarizing film.

Polarizing Elements (FIG. 2)

As discussed above, an unpolarized light beam can be represented as a sum of two beams which have E-field vectors that are linearly polarized along two orthogonal directions, say, x and y. Therefore, if an unpolarized beam is made to interact with a medium that separates the components or eliminates one of the components, then we obtain polarized light. Reflection of unpolarized light from the surface of a dielectric medium at the so-called Brewster's angle causes the reflected light to become linearly polarized. A variety of prisms (e.g., Glan-Thompson and Nicol prisms) produce polarized light using the phenomenon of birefringence, which refers to the optical refractive anisotropy of a medium. In a birefringent material, the index of refraction for E-vectors in one direction is different from that for other directions, thereby enabling such a material to separate an unpolarized beam into two orthogonally polarized beams. By absorbing or discarding one of these two beams, linearly polarized light is produced.

The simplest and most economical method to produce polarized light is based on a phenomenon called dichroism, which refers to the optical absorptive anisotropy of a medium. Thus, in a dichroic medium, the absorption coefficient for light with its E-vector in a certain direction is different from that for light with its E-vector in an orthogonal direction. The best-known example of a dichroic polarizer is a polaroid sheet or film. A polaroid sheet consists of a thin film of polyvinyl alcohol (PVA) which is stretched to 3-5 times its original length, treated with iodine or potassium iodide, and laminated with one or two sheets of a suitable plastic base such as cellulose acetate butyrate or acrylic. Light with its E-field along the stretching direction is absorbed heavily, whereas light with its E-field orthogonal to the stretching direction is transmitted. As shown in FIG. 2, a polaroid sheet thus converts unpolarized light incident upon it into linearly polarized transmitted light with its polarization vector perpendicular to the stretching direction.

Phase Shifters and Polarization Rotators (FIG. 3)

As shown in FIG. 1(b), a linearly polarized light beam with its polarization vector E along a general direction can be resolved into two orthogonal components, one polarized along x ($E_x$) and the other polarized along y ($E_y$), such that the phase difference between $E_x$ and $E_y$ is zero. If this beam now passes through a medium that introduces a certain phase shift between $E_x$ and $E_y$, then the polarization characteristics of the beam will be altered. Birefringent media can act as phase shifters in this manner. Such media are characterized by two indices of refraction: one, called the ordinary index ($n_o$), is experienced by light rays with their E-vector along a direction called the optical axis of the medium, and the other, called the extraordinary index ($n_e$), is experienced by light rays with their E-vector perpendicular to the optical axis. Due to the different indices of refraction, the ordinary and extraordinary rays travel with different phase velocities. Therefore, if an ordinary ray and an extraordinary ray, initially in phase, travel through a thickness d of a birefringent material, a phase difference will be introduced between them. For light of wavelength $\lambda$, this phase difference, $\phi$, is given by $$\phi = 2\pi d(n_e - n_o)/\lambda \quad \text{Eq.(1)}$$

Figure 3A:
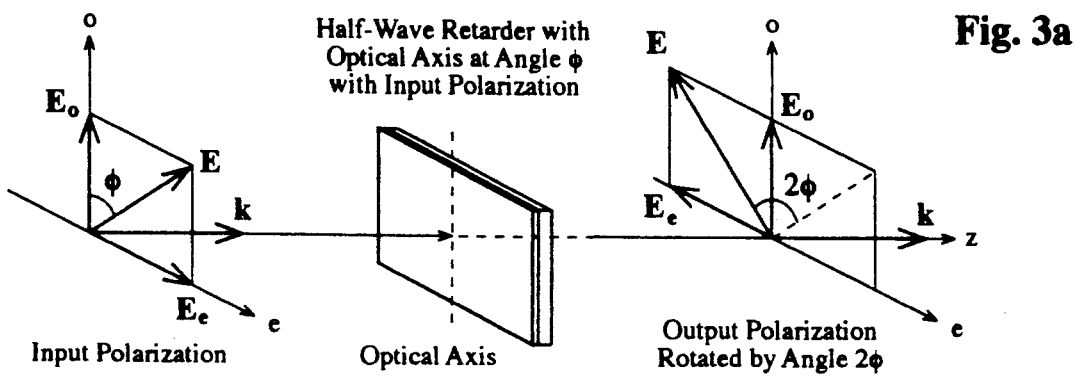
FIG. 3 is a diagram in two sketches a and b. Sketch 3a shows how a half-wave plate rotates an input linear polarization through a desired angle. Sketch 3b shows how a quarter-wave plate converts a linear polarization into a circular polarization.
Figure 3B:
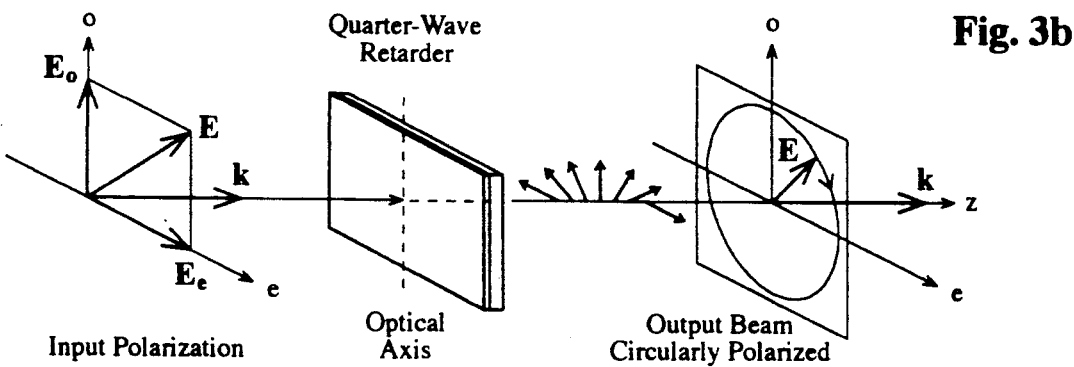
Figure 4A:
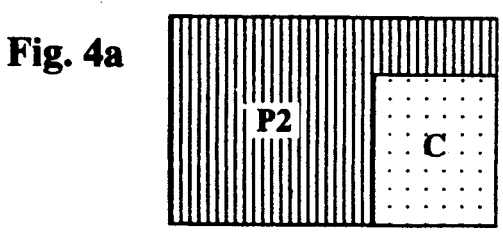
FIG. 4 is a diagram in four sketches a, b, c and d, showing the basic concept of counterfeit prevention and tamper detection by polarization coding. A layer laminated on the base print includes a polarizing region P2 and a clear region C, which have differing characteristics when viewed through a cross polarizer P1.
Figure 4B:
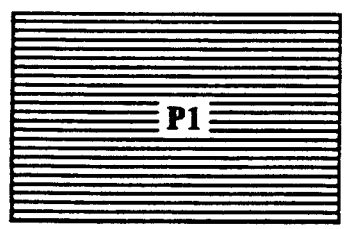
Figure 4C:
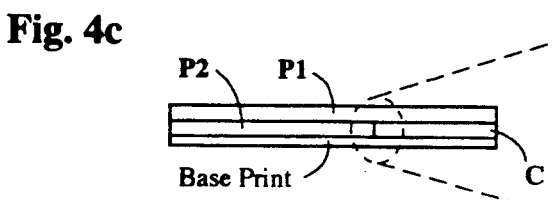
Figure 4D:
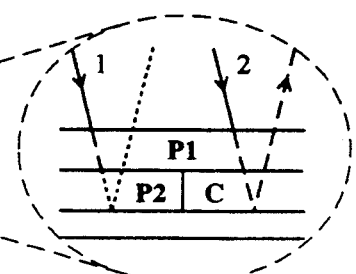

Depending on the value of $\phi$, we get different types of phase shifters (also known as wave plates or retarders). If the material and its thickness are so chosen that $\phi = 180°$, we obtain a half-wave plate. As shown in FIG. 3(a), a half-wave plate can rotate the polarization direction of linearly polarized light through any desired angle, their most wide application being rotation of polarization through 90°. If d ($n_e - n_o$) is so chosen that $\phi = 90°$, we get what is called a quarter-wave plate. Such a device will retard the extraordinary E-vector by 90° with respect to the ordinary E-vector, thereby producing circularly polarized light. This is illustrated in FIG. 3(b). As can be expected, two quarter-wave plates in tandem will act as a half-wave plate.

Phase-shifting wave plates are produced using a variety of optical birefringent media. Crystalline quartz and mica are two of the common materials. In actual construction, a thin sheet of the birefringent material of the desired thickness (determined by Eq. (1)) is supported on a suitable substrate such as glass. The most economical way to make wave plates is, as in the case of polarizers, to use a stretched polymer film (e.g., polyvinyl alcohol) on a plastic base such as cellulose acetate butyrate, cellulose triacetate or acrylic. In the case of wave plates, the stretched polymer is birefringent and it is not necessary to dope it with a dye, which in polarizers is required to bring about the desired anisotropic absorption.

I now describe novel techniques for producing counterfeit-resistant identification cards based on polarization coding of information. The new methods utilize polarizers and phase-retardation media discussed above. These materials are not only economical, but they also lend themselves to cost-effective production processes. In addition, the new techniques also make the task of detecting a false identification card fast, simple and inexpensive.

DETAILED DESCRIPTION OF THE PREFERRED EMBODIMENTS

Counterfeit-Resistant Documents Using Polarizing Films (FIGS. 4-6)

FIG. 4 illustrates one of the methods to code different regions of a document using polarizing films. As an example, the figure shows a driver's license which includes some text information and a photograph. All of this information is produced on a paper and/or plastic medium which I shall call the base print. On top of the base print I now laminate a thin film of polyvinyl alcohol which has been stretched to render it polarizing. I shall denote the direction of the film's polarization as P2, which could be, for example, parallel to the long dimension of the license. The polarizing film is applied over the entire base print except in a certain well-defined area indicated as C in FIG. 4(a). The area C is left clear, i.e., non-polarizing, and could for convenience be the region of the license holder's photograph. I shall describe processes to produce these different regions later in this description.

Visually, the polarizing and clear regions look similar, and therefore, if examined cursorily, no polarization coding of the license is apparent. However, if the license is overlaid (e.g., by a police officer or a liquor store sales clerk) with a polarizer sheet (FIGS. 4(b, c)) such that the latter's axis (P1) is perpendicular to P2, then the region of the license with P2 polarization will appear opaque due to cross-polarization with P1, whereas the unpolarized (clear) region, i.e., the photograph, will still be visible. This is illustrated more clearly in the insert of FIG. 4(d), which shows how a light ray (1) entering the P2 region is completely absorbed and does not exit after reflection from the base print, whereas a ray (2) entering the clear region reaches the print surface and is reflected back, although suffering normal transmission loss in passage through the P1 overlay. Thus, the only item that the detecting agency requires to identify a false license is a linear polarizer sheet. By simply viewing the license through such a polarizer, the identifying feature of the license is revealed. In preliminary experiments with laminated sheet polarizers, I have already verified the basic principle underlying this technique.

The above description of the invention, in which the photograph area is non-polarizing (C) and the rest of the license is covered with a polarizing film (P2), is the simplest way of introducing polarization coding as a security measure, and has been presented primarily to illustrate the novel concept. In a more desirable scheme, the license can have several regions of both P2 and C types, each with certain distinguishing features. Two such schemes are illustrated in FIGS. 5 and 6.

In FIG. 5, I illustrate a driver's license in which the polarization-coded information has been included in the form of alternating polarizing and non-polarizing stripes that resemble a simplified bar code. Therefore, when the license is overlaid with a polarizer with its axis P1 perpendicular to the axis P2, the areas of the base print covered by the polarizing layer P2 become invisible due to cross polarization between P1 and P2, whereas the remaining regions of the base print which are non-polarizing appear as a set of stripes. The arrangement of these stripes can be designed in any desired fashion.

Further sophistication can be provided in the above polarization coding methods by including alphanumeric characters as distinguishing features. Such characters can be the identification card number, the holder's social security number, date of birth, or any other suitable identification. FIG. 6(a) shows a card in which the polarizing film covering the base print is so patterned that it covers the entire print except in the regions of the photograph and the characters 'DOT 92' which are left non-polarizing. In normal viewing, the identifying characters will not be observable, but when the card is viewed through a P1 polarizer, the characters will become visible along with the holder's photograph. Other variations of the novel polarization coding method may combine identifying alphanumeric characters with a bar code, as shown in FIG. 6(b).

I now describe several methods for producing the polarizing and non-polarizing regions on the surface of the identification card. Three types of techniques are described: mechanical, radiation, and chemical.

Mechanical Techniques

These methods consist in starting with a P2 polarizing film covering the whole base print of the identification card and then mechanically removing the regions that are desired to be clear (i.e., non-polarizing). The stretched PVA polarizing film is obtained on a suitable base that can be peeled off. The film is mechanically stamped so as to create demarcation cuts that correspond to the desired polarizing and non-polarizing regions. Now the film from the regions corresponding to the non-polarizing areas is removed, and the rest is laminated on top of the base print. Since the thickness of the film is only 10–15 microns ($\sim 0.0005$ inch), the difference in the thickness of the completed license resulting from the removal of the film from the clear regions will be imperceptible. Such mechanical methods are highly economical and attractive when the same patterns of polarization coding are to be produced on each identification card.

Radiation Techniques

Polarizing films produced by stretching polymers and doping them with dyes have the property that they can be bleached with intense ultraviolet, visible or infrared radiation. Thus, if a certain region in the film is irradiated with intense light, it loses its anisotropy and becomes non-polarizing. To exploit this property for producing polarization-coded identification cards, the polarizing film is first attached to the base print. It is then exposed to light from a suitable lamp source or a low-power laser using a mask which defines the areas to be exposed. The exposed areas thereby become non-polarizing. In the case of simple patterns such as a rectangle stripes, the mask can be a permanent and hard fixture, including a stencil. In the scheme where the polarization-coded features are unique to each card (e.g., those including the holder's identification number), the mask can be generated on transparent film using conventional photographic means from printed information. Since molecular arrangements in polymers can also be affected by other electromagentic fields, I expect that radiation sources other than those at optical wavelengths may also be suitable for making the film isotropic.

Chemical Techniques

These techniques consist in chemically treating a stretched polyvinyl alcohol film in selected areas to make it polarizing. For example, a printing process may be designed that prints patterns with iodine or a potassium iodide solution on the stretched PVA film. The film will then become polarizing only in the areas where the dye is received. Alternatively, one may start with a polarizing film and then use a bleach solution, such as sodium hydroxide, to render selected areas non-polarizing. Since chemical techniques involve wet processes, they are often cumbersome, and therefore, are less preferred than the mechanical and radiation techniques. Of the latter two, the method of selective exposure with a light source is the most desirable.

Figure 7A:
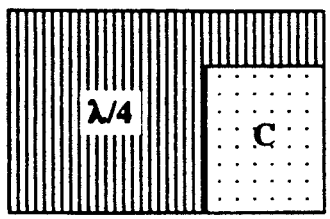
FIG. 7 is a diagram in four sketches a, b, c and d, showing the basic concept of counterfeit prevention and tamper detection by polarization coding employing phase shifting. A layer laminated on the base print includes a quarter-wave phase-shifting region $\lambda/4$ and a clear region C, which produce differing characteristics when viewed through a polarizer P1.
Figure 7B:
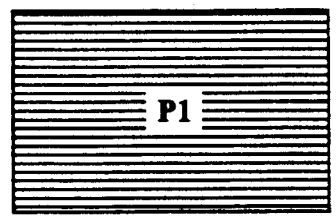

Counterfeit-Resistant Documents Using Phase-Shifters (FIGS. 7 and 8)

Another attractive method to produce counterfeit-resistant documents uses a quarter-wave phase shifting layer. This technique is illustrated in FIG. 7 for a driver's license. The base print of the license is laminated with a polymer film that acts a quarter-wave phase-shifting (retarding) layer. As described in Sec. III.1, such a layer converts linearly polarized light into circularly polarized light. Stretched polymer films such as polyvinyl alcohol make inexpensive quarter-wave retarder layers that can be conveniently applied on the flexible paper or plastic base print of the license. In a specified region of the license, the layer is made clear, i.e., non-retarding, by appropriate processing. In visual appearance, the retarding region (shown as $\lambda/4$) and the non-retarding region (C) look undifferentiable. However, when viewed through a linear polarizer sheet, the retarding region appears dark, whereas the non-retarding region remains clearly visible. The discrimination between the two regions is brought about by the quarter-wave layer as follows.

Figures 7C, 7D:
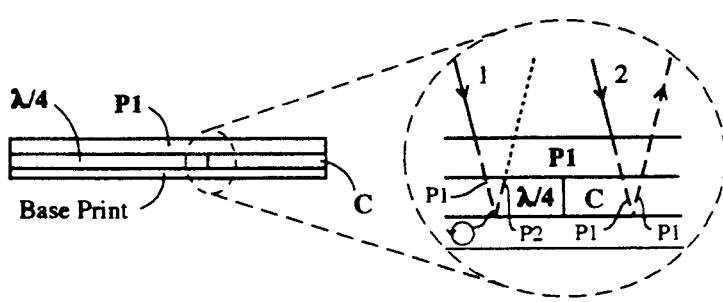

Let P1 be the axis of the polarizer sheet through which the license is viewed. Unpolarized light incident on this sheet is filtered to P1 polarization after transmission through it. As shown in FIG. 7(d), the linearly polarized P1 light now passes through the $\lambda/4$ layer and is converted to circular polarization upon reaching the base print. The circularly polarized light, after reflection from the base print, travels back through the $\lambda/4$ layer and is reconverted to a linear polarization P2, which is rotated by 90° from P1. Another way of understanding this polarization rotation is that two $\lambda/4$ layers in tandem act as a $\lambda/2$ layer which rotates a linear polarization by 90°. Since polarization P2 is orthogonal to the axis P1, the region of the license having the $\lambda/4$ layer appears dark. On the other hand, in the clear (C) region, no polarization rotation takes place, and therefore the region remains clearly visible. I remark that the scattering at the base print surface will cause some polarization scrambling. Nevertheless, there will be sufficient conversion of P1 light to P2 light so that the $\lambda/4$ region will appear perceptibly darker than the clear region. Additionally, the reflectivity of the base print may be appropriately modified by a suitable surface treatment to enhance the P1 to P2 conversion. In preliminary experiments with laminated sheet quarter-wave retarders, I have already verified the basic principle underlying the proposed counterfeit-prevention technique.

Figure 8A:
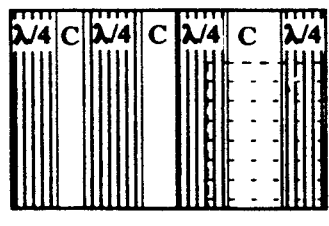
FIG. 8 is a diagram illustrating counterfeit-prevention and tamper-detection configurations in three sketches a, b and c, showing use of a quarter-wave phase-shifting layer in specified regions to create distinguishing and information-bearing patterns. The sketches show: 3a, a set of stripes; 3b, alphanumeric characters and a photograph; and 3c, a bar code as well as alphanumeric characters and a photograph.
Figure 8B:
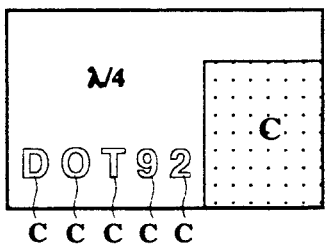
Figure 8C:
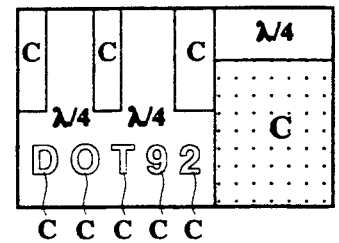

In the above description, the technique of applying a quarter-wave phase-shifting layer as a counterfeit prevention measure has been presented in a simplified form. Several more desirable schemes are illustrated in FIGS. 8(a–c). In each of these implementations, there are more than one regions of both phase-shifting and non-phase-shifting type which define multiple distinguishing features. FIG. 8(a) shows a license with a bar code pattern of $\lambda/4$ and C regions. In FIG. 8(b), the C regions are defined by the characters 'D O T 9 2' and the driver's photograph. The characters are unobservable in normal viewing, but become visible along with the photograph when viewed through a linear polarizer. The distinguishing features in the license illustrated in FIG. 8(c) include alphanumeric characters, a bar code and the driver's photograph.

I now describe processing methods to apply the $\lambda/4$ layer in specified areas of the license. These methods are similar to those discussed in the section entitled Counterfeit-Resistant Documents Using Polarizing Films for producing patterned polarizing regions. Of the three classes of methods described there, the order of preference by their ease of implementation is exposure by intense radiation, mechanical stamping, and chemical processing. In each case, the λ/4 layer is first applied on the entire base print, and then the areas desired to be clear are made isotropic or removed. In the radiation method, the specified areas are exposed through a mask. Depending upon the polymer, the exposure may make such areas either isotropic directly, or differentially soluble in a suitable chemical, thereby enabling their removal. As in the case of polarization coding, the mask may be either hard, or generated photographically on transparent film. The mechanical method involves stamping the λ/4 layer to create appropriate demarcation cuts and then removing the film from the C regions. In the chemical processing techniques, the C regions of the λ/4 layer are either bleached or dissolved away following a radiation step.

While the invention has been shown preferably in the form of an identification card, it will be clear to those skilled in the art that the modifications described as alternatives, and other embodiments, may be pursued without departing from the spirit and scope of the invention, as defined in the following claims.

I claim:

1. A security-document system comprising:
   a) a polarizing viewer; and
   b) an identification document comprising:
      a data substrate having a display surface upon which visible indicia may be displayed;
      a polarization-altering transparent overlay lamination permanently attached to said data substrate, whereby any visible data displayed on said display surface remains visible through said polarization-altering overlay lamination; and
      polarization-coded personalizing indicia borne by said polarization-altering overlay lamination as physical changes viewable through said polarizing viewer.

2. A tamper-evidencing, self-validating identification card for use in a security-document system having a polarizing viewer for use as a validation viewer, comprising:
   a data substrate having a display surface upon which visible indicia may be displayed;
   a polarization-altering transparent overlay lamination permanently attached to said data substrate, whereby any visible indicia on said display surface remains visible through said polarization-altering overlay lamination; and
   polarization-coded personalizing indicia borne by said polarization-altering overlay lamination as physical changes viewable through said polarizing viewer.

3. A security document system having a polarization-altering identification document and a polarizing tamper-detection viewer, which viewer when superposed over said identification document in viewing attitude provides for such identification document both a view of otherwise non-visible data and visible evidence of any tampering with such identification document, characterized by:
a data substrate having personalization indicia forming a base print of low-security indicia readable on said identification document without the need for a viewer; and
a personalized polarization-altering overlay, permanently attached to said data substrate base print in such fashion that the low-security indicia carried on the surface of the base print is directly viewable through said overlay; said overlay being encoded with normally unreadable semi-secure indicia made readable under the influence of the polarizing tamper-detection viewer, the polarization direction of the viewer being so oriented that the composite of the polarizing viewing device and said personalized polarization-altering overlay superposed in viewing attitude makes the encoded indicia in said overlay visually readable.

4. A security document according to claim 3, wherein the indicia encoded in said personalized overlay is physically imprinted by a physical change to its polarization-altering characteristics and localized to the area of printing.

5. A security document according to claim 4, wherein said physical change is polarization-altering altering regions defining the indicia.

6. A security document according to claim 4, wherein the indicia encoded in said personalized polarization-altering overlay is in a machine-readable code.

7. A security document according to claim 4, wherein the indicia encoded in said personalized polarization-altering overlay is a bar code.

8. A security document according to claim 4, wherein the indicia encoded in said personalized polarization-altering overlay is alphanumeric characters.

9. A security document according to claim 4, wherein the indicia encoded in said personalized polarization-altering overlay is a photographic representation.

10. A security document according to claim 4, wherein said physical change is non-polarization-altering regions defining the indicia.

11. A security document according to claim 10, wherein said physical change of non-polarization-altering regions defining the indicia is produced by selective localized treatment by one or a composite of the following physical change mechanisms:
   radiation treatment;
   thermal treatment;
   chemical treatment;
   mechanical treatment.

12. A security document according to claim 11, wherein said physical change is produced by a computer-controlled scanning laser.

13. A security document according to claim 11, wherein said physical change is produced by exposure with a light source through a personalized mask.

14. A security document according to claim 11, wherein said physical change is removal by delamination.

15. A security document according to claim 3, wherein said polarization-altering overlay is a linear polarizing layer.

16. A security document according to claim 3, wherein said polarization-altering overlay accomplishes an optical phase shift between two orthogonal linearly polarized inputs.

17. A security document according to claim 16, wherein said phase shift is a quarter-wave optical phase shift.

18. A security document according to claim 3, wherein the indicia encoded in said personalized overlay is physically imprinted by a physical change to its polarization-altering characteristics and localized to the area of non-printing.

19. A security document according to claim 3, wherein the indicia encoded in said personalized polarization-altering overlay and the indicia imprinted on said base print act in concert to provide at least one composite symbol useful in determining tampering.

20. A security document system according to claim 3, wherein said polarization-altering overlay has different regions of at least two types of polarization-altering characteristics, and said polarizing tamper-detection viewer has corresponding regions with different polarization directions oriented in such fashion that the composite of the polarizing viewing device and said personalized polarization-altering overlay superposed in viewing attitude makes the encoded indicia in said overlay visually readable.

* * * * *